Paul A. Dion,
Arthur J. Thomson,
Inventors.
Koenig, Senniger, Powers and Leavitt,
Attorneys.

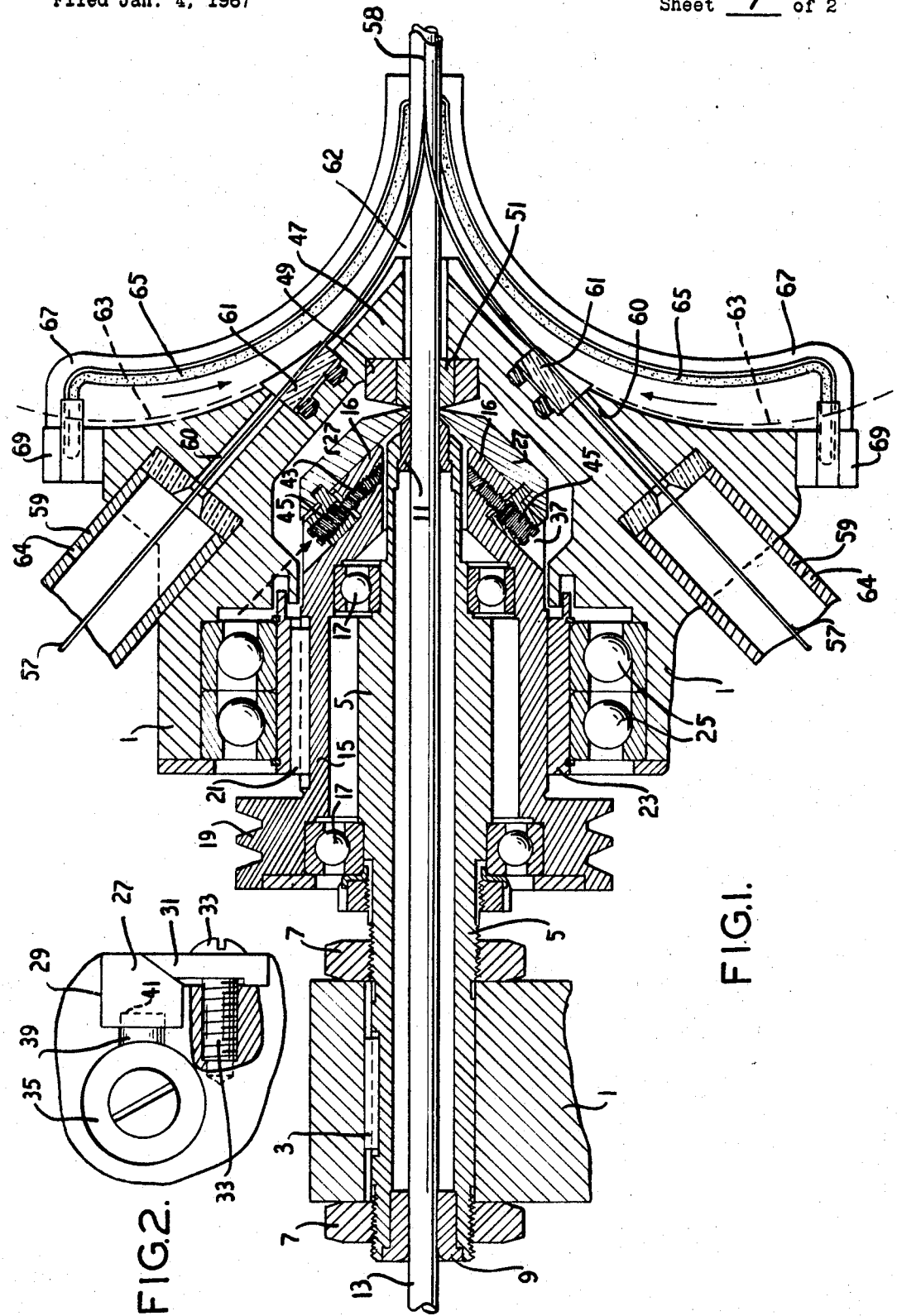

United States Patent Office 3,444,603
Patented May 20, 1969

3,444,603
MANUFACTURE OF CLAD WIRE AND THE LIKE
Paul A. Dion, North Attleboro, Mass., and Arthur James Thomson, Cranston, R.I., assignors to Texas Instruments Incorporated, Dallas, Tex., a corporation of Delaware
Filed Jan. 4, 1967, Ser. No. 607,254
Int. Cl. B21f *19/00;* B23p *25/00*
U.S. Cl. 29—33                                 10 Claims

ABSTRACT OF THE DISCLOSURE

A wire is pulled by squeeze rolls through a drawing die, a guide bushing, a circumferential milling device, and an axially operative shaving die. The shaving die forms a virgin surface on the wire. The milling device is operative closely adjacent to the inlet of the shaving die so as to cut away its chips and prevent jamming thereby and wire breakage. Between the shaving die and the draw rolls clean cladding strips are brought into engagement with the virgin surface of the wire to effect solid-phase bonding thereto under roll squeezing action. They converge in a compartment leading to the rolls and containing a protective or reducing atmosphere. The cutting edge of the shaving die also forms a gas seal around the wire inlet to this compartment.

---

This invention relates to a method and apparatus for preparing metal wire or wire-like core and strip material for solid-phase bonding to make clad wire and the like.

Among the several objects of the invention may be noted the provision of improved means for the cleaning of a cylindrical core preparatory to applying a clean substantially flat strip to the core for solid-phase bonding to produce better clad wire rods or the like and the provision of such means which will permit reliable solid-phase bonding of the core and cladding by roll squeezing under comparatively low pressures and reductions. Other objects and features will be in part apparent and in part pointed out hereinafter.

The invention accordingly comprises the methods and constructions hereinafter described, the scope of the invention being indicated in the following claims.

Figure 3:
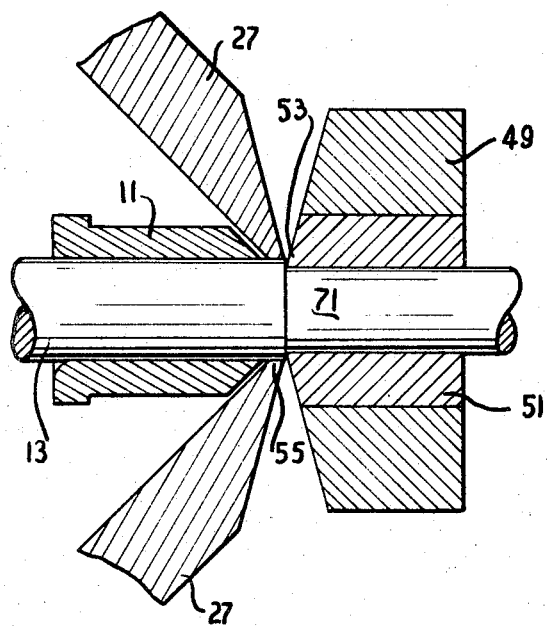
Figure 4:
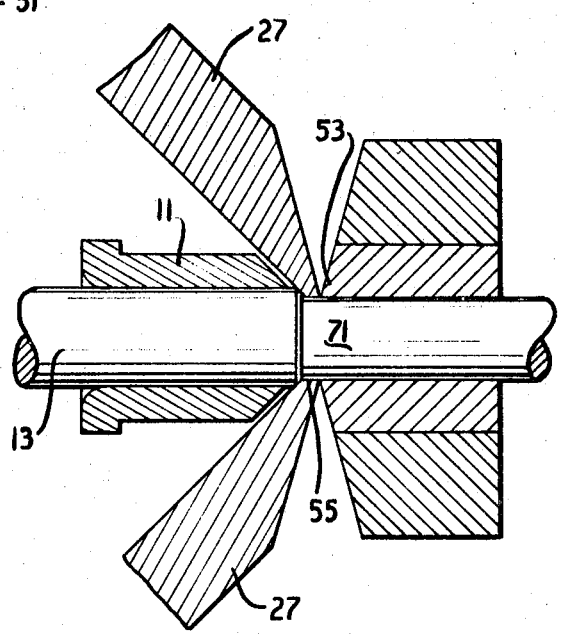
Figure 5:
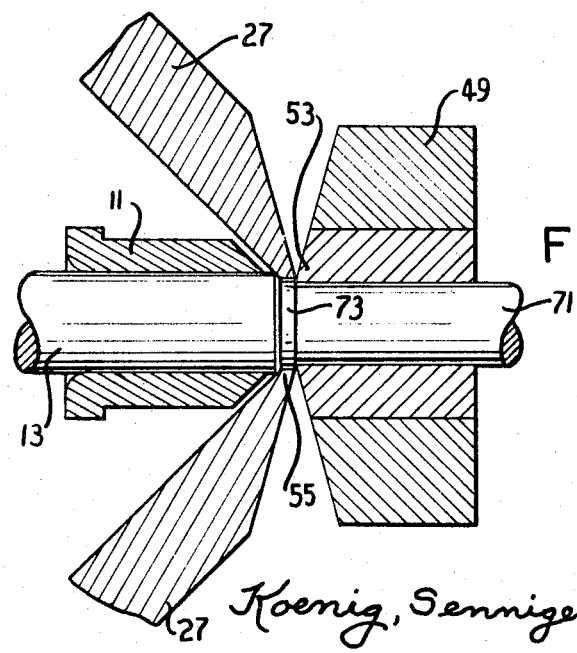

In the accompanying drawings in which one of the various possible embodiments of the invention is illustrated, FIG. 1 is an axial section of significant parts of apparatus employing the invention;

FIG. 2 is an enlarged end view along the broken dart shown on FIG. 1 showing certain cutter-adjusting means; and FIGS. 3, 4 and 5 are diagrammatic views illustrating various hollow milling and axial shaving operations which may be carried out by the apparatus of FIG. 1.

Corresponding reference characters indicate corresponding parts throughout the several views of the drawings.

The term "wire" as used herein is intended to comprehend rods, tubes and the like of such gauges that they are flexible in continuous lengths for coiling or the like.

It is known to form clad wires by solid-phase bonding of flat strips around cores. This is accomplished by passing the strips and the cores through properly formed squeeze rolls for conforming them while reducing their combined cross sections. As disclosed in United States Patents 2,691,815 and 2,753,623, to effect solid-phase bonding between two metal surfaces each must be meticulously clean. This, among other things, may be accomplished by exposing virgin metal at the interface to be bonded. When more or less flat strip materials are to be bonded, their adequate cleaning can be accomplished by various means including wire brushing or the like and heating. However, such an operation is difficult to accomplish when it is desired to clean a wire core the surface of which is cylindrical and cannot be effectively cleaned by such processes. Moreover, it is desirable to solid-phase bond under as low a squeezing pressure as feasible in the core of clad wire because of the difficulty of evenly applying large pressure circumambiently to such material without distortion of the core and cladding. By providing virgin surface on the wire for bonding, lower squeezing pressures can be employed.

It has been suggested either to shave off the surface of cylindrical core material by drawing it through a shaving die or, to effect surface removal by circularly milling it by the rotary cutters of a so-called hollow mill head. Each of these methods when used individually has serious drawbacks. The shaving technique has in general been difficult to carry out, and more particularly when a core wire is composed of aluminum. This is because of the tendency of shaved material to pile up ahead of the cutting edge of the shaving die. In so doing the material tends to shear axially along the wire ahead of and under the cutting edge of the shaving die. The shearing action is irregular and produces an irregular surface on the wire which emerges from the die. This causes a very large and undesirable tension on the core material which frequently causes breaking of the core wire.

The use of the hollow milling technique also has its disadvantages when used individually because the wire must be carefully guided in its movements to and from the cutters of the hollow milling head. For this purpose carbide dies have been used ahead of and beyond the cutters with hole sizes in the dies about equal to the wire diameter. This has involved the difficulty that the freshly-machined material (particularly aluminum) would carry particles through the exit die with deleterious effects on the core surface, since such particles would undesirably pass into the nip space between the pressure-bonding rolls. In addition the frequently machined material (particularly aluminum) tends to gall on exit guide.

We have combined rotary hollow milling and shaving operations and this works reasonably well but we have discovered that small amounts of shaved material accumulating ahead of the shaving die and eventually clogs the hollow milling head, thus causing excessive tension in and sometimes fracture of the wire. In order to avoid this the shaving die is preferably arranged promptly to perform the final cleaning cut.

A subsidiary problem is that the wire as it enters a guide die ahead of the milling cutters may be coated with lubricant used in a preceding drawing die. By means of our invention this lubricant may be machined off along with the surface layer of the metal. However, there is some concern that the resulting oil-laden atmosphere will recontaminate the metal surface and interfere with subsequent bonding. This problem is best avoided in the embodiments shown in FIGS. 3 and 5 which are more fully discussed below.

Referring now more particularly to FIGS. 1 and 2 of the drawings, there are shown at numerals 1 suitably connected parts of a supporting framework. Keyed at 3 in a hole in one portion of the framework 1 is a projecting guide sleeve 5. The sleeve is threaded to receive lock nuts 7 for adjustably affixing it. At its left-hand end the sleeve 5 carries a lubricated drawing die 9. At its right-hand end the sleeve 5 carries a core-guiding bushing 11 which has a conical outer end as shown. Lubricant on the wire-like material from die 9 may reach and pass through the guide bushing 11, since the core wire 13 by suitable conventional means is drawn from left to right through the bushings 9 and 11. This lubricant on the wire creates another problem solved by the invention, as will appear.

At numeral 15 is shown a rotatable sleeve supported on bearings 17 carried on the sleeve 5. A belt-driven sheave 19 is employed to rotate the sleeve 15. For additional rotary stability the outside of the sleeve 15 is keyed as at 21 to an inner sleeve 23 which supports the inner races of outer bearings 25. The outer races of the latter are carried in a part of the framework 1.

The right-hand end of the rotary hollow sleeve 15 is conically shaped as at 16 to provide sloping guide means for cutters 27. These cutters on the hollow sleeve form therewith a hollow rotary milling head. As shown in FIG. 2, each cutter 27 is carried slidably in a guide way 29 and adapted to be locked in any adjusted position by a clamp bar 31 held by suitable screws, one of which is shown at 33. When a clamp 31 is released by loosening its screws 33 the adjacent cutter 27 may be moved for adjustment in a guide way 29. After cutter adjustment the screws 33 are again tightened. In order finely to adjust each cutter 27, a nut 35 is employed which is slidable in a recess 37 in the conical end 16 of the sleeve 15. The nut is prevented from rotating by a lug 39 extending therefrom into a socket 41 in the adjacent cutter 27. A conventional differential screw having one smaller portion 43 threaded into the conical portion of the sleeve 15 and another larger portion 45 threaded through the nut 35 provides for fine adjustment of the cutter 27 which it controls. The threads on the portions 43 and 45 of the screw are cut with different leads so that with a comparatively large amount of turning movement of the differential screw advance and retraction of the adjacent cutter 27 in its guides 29 will be comparatively small, thus providing for easily making fine adjustments.

As shown in FIG. 1, the cutting edges 55 of the cutters 27 operate on wire 13 immediately beyond the conical end of bushing 11 to remove material from the core wire 13 by rotary cutting or milling action. Immediately beyond the cutting ends of the cutters 27 and mounted in a converging portion 47 of the framework 1 is a shaving die 49. The die contains an inner carbide or tool steel for example liner 51 which has a sharpened circular shaving edge 53. This shaving edge as illustrated is positioned very closely to the circular trajectory or plane of operation of the cutting edges 55 of the rotary cutters 27. By "closely" is meant that the plane of the cutting edge of the liner 51 is such that cutters 27 can help cut away shavings generated by the shaving die 49. This generally involves only a few thousandths of an inch (.002 inch for example) between the right side of the cutting plane of the cutters and the cutting edge of the shaving die 51.

Numerals 57 indicate parts of the metal (copper, for example) strips which enter passages 60 in the framework 1 from retorts 59 containing suitable protective atmospheres which may be either of the inert or reducing type. It will be understood that the strips 57, before entering the retorts 59, have been suitably cleaned by wire-brushing or the like at least on their insides to expose inside clean surfaces. At numerals 61 are shown spring-pressed guides for the strips by means of which they are guided into the nip space between compression rolls 63. The rolls are indicated by dotted lines. The guides are spring-pressed against the roll margins. As known, the nip space between said rolls is shaped so as to accept the wire 13 along with the strips 57, bending the latter transversely around the wire and squeezing them with a reduction sufficient to effect solid-phase bonding. This involves semi-circular or like grooves in the rolls 63 as is known. The rolls pull the core 13 and the strips 57 through our apparatus. Engaging opposite ends of the rolls are seals 65 carried in recesses of side plates two of which are shown at 67, each for engagement with one end of a roll. These plates 67 are attached to the framework 1 by means shown at 69.

The outlet passages 60 from the retorts 59 extend to the right so that the reducing or protective atmosphere carried in the retorts 59 may escape into the space at 62 wherein the core 13 and the strips 57 enter the nip space between the rolls. Openings are shown at 64, for example for introducing a reducing atmosphere into the retorts 59. Conventionally, the strips 57 are suitably heated in or upon entry into the retorts 59 to remove oil, oxides and the like. If desired, a reducing atmosphere such as hydrogen in the retorts 59 may be employed to remove oxides if present. Otherwise an inert protective atmosphere such as argon is sufficient.

Operation is as follows: The rolls 63 rotate in the direction shown by the curved darts on FIG. 1, thus drawing into the nip space between them the core wire 13 (made, for example, of aluminum) and the strips 57 (made, for example, of copper). In the nip space between rolls 63, the strips 57 are bent transversely and conformed semicircularly around the wire 13 and the composite of the wire and strips is squeezed under pressure to reduce the total cross section of the composite, thereby effecting solid-phase bonding. The margins of the strips 57 are also solid-phase bonded and produce transverse fin portions such as the one shown at 58. These are subsequently removed by skiving or other conventional means, not shown. The action of the cutters 27 and of the shaving die 49 effect cleaning by removing material from the surface of the core 13 thus exposing virgin metal on the core as it enters the nip space. The cutters 27, as above made clear, are rotated by the sleeve 15 on which they are carried.

As above indicated, there shall be a very close distance of only a few thousandths of an inch or so (.002 inch, for example) between the outermost cutting portions of the cutters 27 and the shaving edge of the shaving die 49. The particular amount of this distance may be varied to suit circumstances by shifting the axial position of the guide sleeve 5. Thus lock nuts 7 may be loosened and the sleeve 5 shifted axially after which the nuts 7 are returned to a locking position. Shifting of the first sleeve 5 carries with it an axial shift of the second rotatable outer sleeve 15. The key 21 permits axial sliding of the sleeve 15 in the inner sleeve 23 which supports the inner races of the bearings 25. Thus, when the sleeve 5 is shifted, the cutting edges of the cutters 27 become shifted with respect to the shaving edge 53 of the shaving die 49, the preferable spacing between these being a few thousandths of an inch, as above stated. It will be apparent that when the sleeve 5 is shifted the guide bushing 11 is shifted along with it in its permanent position with respect to the left side of the cutting plane of the cutters 27. The distance between the right-hand sloping end of the bushing 11 and the insides of the cutting edges of the cutters 27 is also small but need not be as small as that between the cutting and shaving edges of the cutters 27 and die 49 respectively.

Important features of the invention are illustrated in the enlarged FIGS. 3, 4 and 5. These figures illustrate three basic types of cutting action which can be accomplished by adjusting the positions of the cutters 27. Thus, referring to FIG. 3, cutters 27 are adjusted not to cut but only to graze the surface of wire 13. The cutting edge 53 of the shaving die 49 removes all of the metal to be removed for producing the virgin surface at 71 on the core wire 13. The function of the cutters 277 in the case of this adjustment is to remove the shavings formed by the cutting edge 53 of the shaving die 49. This has the advantage of mitigating the piling action of chips ahead of the shaving die 49 and therefore reducing the undesirable shearing and roughening action above referred to. Die 49 also acts as a gas seal for chamber 62.

In FIG. 4 the adjustment is the converse of the above. In this case the cutters 27 remove all of the aluminum for producing the virgin surface 71. The cutting edge 53 of the shaving die 49 simply grazes the surface formed by cutters 27. Thus it prevents chips from the rotary cuts performed by the cutters 27 from passing through to the bonding area. This embodiment is not preferred since there is a possibility of recontamination of the cleaned surface by oil-laden atmosphere and because of the criticality of alignment of the die and the cutter center line.

In FIG. 5 both the rotary cutters 27 and the edge 53 of the die 49 remove aluminum from the surface of the wire 13. Thus the hollow mill including the cutters 27 removes a portion of the surface material to one depth and the shaving die 49 removes the remainder to the complete depth. As in the FIG. 3 embodiment the cutters 27 also remove shavings formed by the die 49 which mitigates the pile up of chips and the undesired shearing action above referred to. The FIG. 5 adjustment is preferred for the reason that if any oil gets through the guide bushing 11 and onto the virgin surface of the cut 73 performed by the cutters 27, this oil is removed along with the additional material that the cutting edge 53 of the shaving die 49 removes. Once the virgin surface 29 finally formed by the edge 53 enters the die 49, it is not accessible to further contamination by the oil. Additionally, the die 49 functions as a gas seal for chamber 62.

Dimensional examples (but without limitation) for the adjustments illustrated in FIGS. 3 to 5 are as follows: As to FIG. 3, the diameter of the wire 13 up to the cutting edge 53 of the shaving die 49 may be .385 inch, and the diameter of the all-shaved part 71 may be .361 inch. As to FIG. 4, the diameter of the wire 13 to left side of the cutting edges of the cutters 27 may be again .385 inch and the diameter of the all-milled part 71 may be .361 inch. Thus the difference between the FIG. 3 and FIG. 4 operations is that in FIG. 3 the shaving die effects all of the metal removal from the body of the wire and the cutters 27 effect simultaneous cutting away of the resulting shavings; whereas in the case of FIG. 4 the cutters 27 effect the metal removal from the body of the wire and the shaving die 49 effects simultaneous removal of the cutter chips. In FIG. 5 both of the cutters 27 and the shaving die 49 effect removal of metal from the body of the wire. In this case the diameter of the core material 13 up to the cut 73 may be .385 inch. Then the milled cut 73 may be .369 inch in diameter and the shaved part 71 may be .361 inch. Thus in this preferred case of FIG. 5 both the rotary milling cutters and the shaving die remove metal, operating in conjunction with the other for chip and shaving removal. This gives optimum results.

Typical speeds at which the core material and the strips 57 enter the nip space between the rolls 63 may be on the order of 50 to 100 feet per minute. With the close arrangement of the cutters 27 and the shaving die 49 with respect to the nip space between the rolls, the virgin surface established on the wire 13 may become bonded to the copper strips 57 in a matter of 0.2 second or so later, so that the virgin surface of the core material does not have any substantial time for reforming aluminum oxide thereon or for absorbing or otherwise interacting with gaseous or other bond deterrent materials.

It will be understood that while the instant invention is particularly well adapted for claddings such as copper and for a core material of aluminum, it is also adaptable for use with other material combinations.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for removing the surface material from axially moving wire-like material, comprising a milling cutter rotatable in a cutting plane around the material, an axially operative shaving die having a shaving edge operative in a cutting plane adjacent to said plane of said cutter, and means for drawing said material first through said cutting plane of the cutter and then through said cutting plane of the shaving die, the distance between said planes being close enough that the cutter cuts away shavings or chips formed by the die.

2. Apparatus made according to claim 1 wherein said distance is on the order of a few thousandths of an inch.

3. Apparatus made according to claim 1 including a guide bushing for leading said material into said cutting plane of the cutter, said guide bushing having an outlet closely adjacent to said plane of the cutter.

4. Apparatus made according to claim 1 wherein the diameter of the cutting edge of the shaving die is such as to remove surface material from the material, and the cutting means is radially positioned simultaneously also to remove surface material from the material.

5. Apparatus for removing surface material from wire, comprising a supporting framework, an axially adjustable sleeve extending from a first part of the framework to a second part thereof and having an inlet and an outlet for the wire, draw rolls for pulling wire through the sleeve from its inlet through its outlet, a second sleeve rotatably supported around said first sleeve, a hollow milling head carried by said second sleeve and including cutters adjacent said outlet for cutting into the wire, the said second part of the framework carrying a shaving die for receiving the wire from the cutters and located closely enough adjacent to them on their sides from which the wire emerges so that chips from the shaving lie are removed by the cutters to prevent jamming thereby and wire breakage, said first sleeve carrying at its outlet end a guide bushing closely adjacent to the other side of the cutters for guiding the wire to the cutters and the die, said first sleeve having at its inlet end a drawing die for the wire.

6. Apparatus made according to claim 5 wherein said first sleeve is axially adjustable and said rotatable second sleeve is carried by the first sleeve for axial movement therewith when the first sleeve is axially adjusted, whereby the axial distance between the cutters and the shaving die may be adjusted while maintaining a fixed axial relationship between said bushing and said cutters.

7. Apparatus made according to claim 6 including means on said second part of the framework for guiding strips of cladding material to opposite sides of the wire-like material which emerges from the shaving die.

8. Apparatus made according to claim 7 wherein said draw rolls are adapted to squeeze the strips on the wire to clad them.

9. Apparatus made according to claim 8 including retorts through which the strips move to the rolls, said retorts carrying protective or reducing atmospheres for the strips.

10. Apparatus made according to claim 9 including passages extending from said retorts for carrying said atmosphere from the retorts along the strips to the wire inlet region adjacent said rolls.

References Cited

UNITED STATES PATENTS

| | | | |
|---|---|---|---|
| 3,038,361 | 6/1962 | Holzer | 82—20 |
| 2,323,700 | 7/1943 | Bailey | 29—33.51 |
| 2,233,928 | 3/1941 | Weaver | 29—33.51 |
| 1,704,635 | 3/1929 | Snyder | 29—33.51 |
| 3,142,228 | 7/1964 | Lindemann | 29—33.51 |
| 3,195,336 | 7/1965 | Lindemann | 29—33.51 |
| 2,394,381 | 2/1946 | Hoern | 29—33.51 |
| 3,128,658 | 4/1964 | Mitchell | 82—20 |

FOREIGN PATENTS 609,591   11/1960   Canada.

RICHARD H. EANES, Jr., *Primary Examiner.*